US006212459B1

(12) United States Patent
Unterforsthuber

(10) Patent No.: US 6,212,459 B1
(45) Date of Patent: Apr. 3, 2001

(54) BRAKE SYSTEM FOR MOTOR VEHICLES

(75) Inventor: Jakob Unterforsthuber, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/166,150

(22) Filed: Oct. 5, 1998

(30) Foreign Application Priority Data

Oct. 4, 1997 (DE) .............................................. 197 43 960

(51) Int. Cl.[7] .............................. G06F 7/70; G06F 19/00
(52) U.S. Cl. .................................. 701/70; 701/78; 701/83
(58) Field of Search .................................. 701/70, 78, 83; 303/122.09, 114.3, DIG. 4, 155, 167, 166, 13–14; 188/356, 357; 60/403, 577, 547.1, 582

(56) References Cited

U.S. PATENT DOCUMENTS

| 3,685,289 | * | 8/1972 | Kobashi et al. | 60/552 |
| 5,586,814 | | 12/1996 | Steiner . | |
| 5,607,209 | | 3/1997 | Narita et al. . | |
| 5,855,420 | * | 1/1999 | Lawrence | 303/114.3 |
| 5,967,628 | * | 10/1999 | Abe et al. | 303/114.3 |
| 6,062,656 | * | 5/2000 | Unterforsthuber et al. | 303/122.09 |

FOREIGN PATENT DOCUMENTS

| 91 10 739 U | 12/1991 | (DE) . |
| 43 09 850 | 9/1994 | (DE) . |
| 44 40 290 | 12/1995 | (DE) . |
| 195 24 939 | 1/1997 | (DE) . |
| 195 25 985 | 1/1997 | (DE) . |
| 195 42 654 | 5/1997 | (DE) . |
| 196 15 805 | 10/1997 | (DE) . |
| WO 93/24353 | 12/1993 | (WO) . |

* cited by examiner

Primary Examiner—William A. Cuchlinski, Jr.
Assistant Examiner—Gertrude Arthur
(74) Attorney, Agent, or Firm—Evenson, McKeown, Edwards & Lenahan, P.L.L.C.

(57) ABSTRACT

For a vehicle brake system having a brake pedal, a brake booster, a master brake cylinder and an electronically regulatable brake unit arranged between the master brake cylinder and the wheel brakes by which the brake pressure in the wheel brakes can be adjusted independently of the preliminary pressure existing at the output of the master brake cylinder using an electronic control unit, the electronic control unit senses the course of a pedal operating value which is achieved by the brake booster. The pedal operating value is directly proportional to the pedal force applied by the driver by way of the brake pedal. When a predetermined threshold value of the pedal operating value has been reached, the brake pressure in the wheel brakes is generated such that, in the deceleration course, a raised deceleration gradient occurs in the case of a further rise of the pedal operating value in the sense of an increase of the brake booster ratio.

20 Claims, 2 Drawing Sheets

BRAKE SYSTEM FOR MOTOR VEHICLES

BACKGROUND AND SUMMARY OF THE INVENTION

This application claims the priority of Germany Patent Application No. 197 43 960.8, filed Oct. 4, 1997, the disclosure of which is expressly incorporated by reference herein.

The invention relates to a brake system for motor vehicles having a brake pedal, a brake booster, a master brake cylinder and an electronically regulatable brake unit which is arranged between the master brake cylinder and the wheel brakes. An electronic control unit adjusts the brake pressure in the wheel brakes independently of the preliminary pressure existing at the output of the master brake cylinder.

A brake system of this type is known, for example, from German Patent document DE 195 24 939 A1. In the case of this known brake system, in the event of panic braking in dangerous situations, by means of the electronically regulatable brake unit, brake pressure is applied to the wheel brakes in the sense of a drastic braking beyond the actual brake pressure defined by the driver which is triggered by operating the brake pedal. In order to recognize panic braking, the preliminary pressure occurring at the outputs of the master brake cylinders, which is defined by the driver, is analyzed. If the rate of change of this preliminary pressure exceeds a defined threshold value, a drastic braking procedure is implemented. Such a process is also called "braking assist." In the case of such a known brake system, independently of the pedal force applied by the driver by way of the brake pedal, the electronically regulatable brake unit becomes active only when panic braking is recognized and drastic braking must therefore be carried out. The booster ratio of the brake booster, as the result of which, as a function of the pedal force applied by the driver by way of the brake pedal, a specific vehicle deceleration course occurs, is not considered in this case. In particular, in the case of this known brake system, no arbitrary rise of the deceleration gradient is provided in the absolute sense when the pedal force is increased.

From German Patent document DE 195 34 728 A1, a special further development of a brake booster is known by which, when a defined threshold value of the brake pedal force is reached, a rise of the deceleration gradient is achieved in the sense of an increase of the brake booster ratio. On the one hand, this known brake booster arrangement requires high mechanical expenditures and, on the other hand, it is inflexible with respect to the defined threshold value of the brake pedal force and the defining of a raised deceleration gradient.

It is an object of the invention to improve upon a brake system of the above-mentioned type such that an arbitrary deceleration rise in the event of an increasing pedal force is possible in a simple and flexible manner.

This object is achieved by a brake system for motor vehicles having a brake pedal, a brake booster, a master brake cylinder and an electronically regulatable brake unit which is arranged between the master brake cylinder and the wheel brakes. An electronic control unit adjusts the brake pressure in the wheel brakes independently of the preliminary pressure existing at the output of the master brake cylinder. The electronic control unit senses the course of a pedal operating value which is achieved by the brake booster and which is directly proportional to the pedal force applied by the driver by way of the brake pedal. When a predetermined threshold value of the pedal operating value has been reached, by means of the electronically regulatable brake unit, the brake pressure in the wheel brakes is generated such that, in the course of the deceleration, a raised deceleration gradient is reached in the case of a further rise of the pedal operating value in the sense of an increase of the brake booster ratio.

Alternatively or additionally, the electronic control unit senses the deceleration course achieved by the brake booster as a function of a pedal operating value which is directly proportional to the pedal force applied by the driver via the brake pedal. By means of the electronically regulatable brake unit, the brake pressure in the wheel brakes is generated such that a desired deceleration course corresponding to a desired characteristic deceleration curve stored in the control unit occurs when the actual deceleration course deviates from the desired deceleration course preferably within a defined tolerance band.

Advantageous further developments of the invention are described herein.

In a supplementary fashion, it is pointed out that the electronically regulatable brake unit preferably is a hydraulic unit, as illustrated, for example, on Page 212 of *Automobiltechnische Zeitschrift ATZ*, 1997, as part of the "DSC-System" by BMW. Preferably, the pedal operating value, which is directly proportional to the pedal force applied by the driver by way of the brake pedal, is formed by the preliminary pressure which is normally detected using a preliminary pressure sensor provided at the output of the master brake cylinder. The actual deceleration or the actual deceleration course can be determined, for example, by means of the brake pressure existing in the wheel brakes which is proportional to the vehicle deceleration or by means of the rotational wheel speed sensors, which exist in ABS systems anyhow, or by way of longitudinal acceleration sensors.

In a supplementary fashion, it is pointed out that the deceleration course achieved only by the brake booster, as a function of the pedal force applied by way of the brake pedal, is negatively affected, for example, by a vacuum which is too low, by a low friction value of the lining, by a coupling trailer and/or by a high payload. Also in the presence of these negative influential factors, the brake system according to the invention ensures a satisfactory vehicle deceleration for the driver.

Other objects, advantages and novel features of the present invention will become apparent from the following detailed description of the invention when considered in conjunction with the accompanying drawings.

DETAILED DESCRIPTION OF THE DRAWINGS

Figure 1:
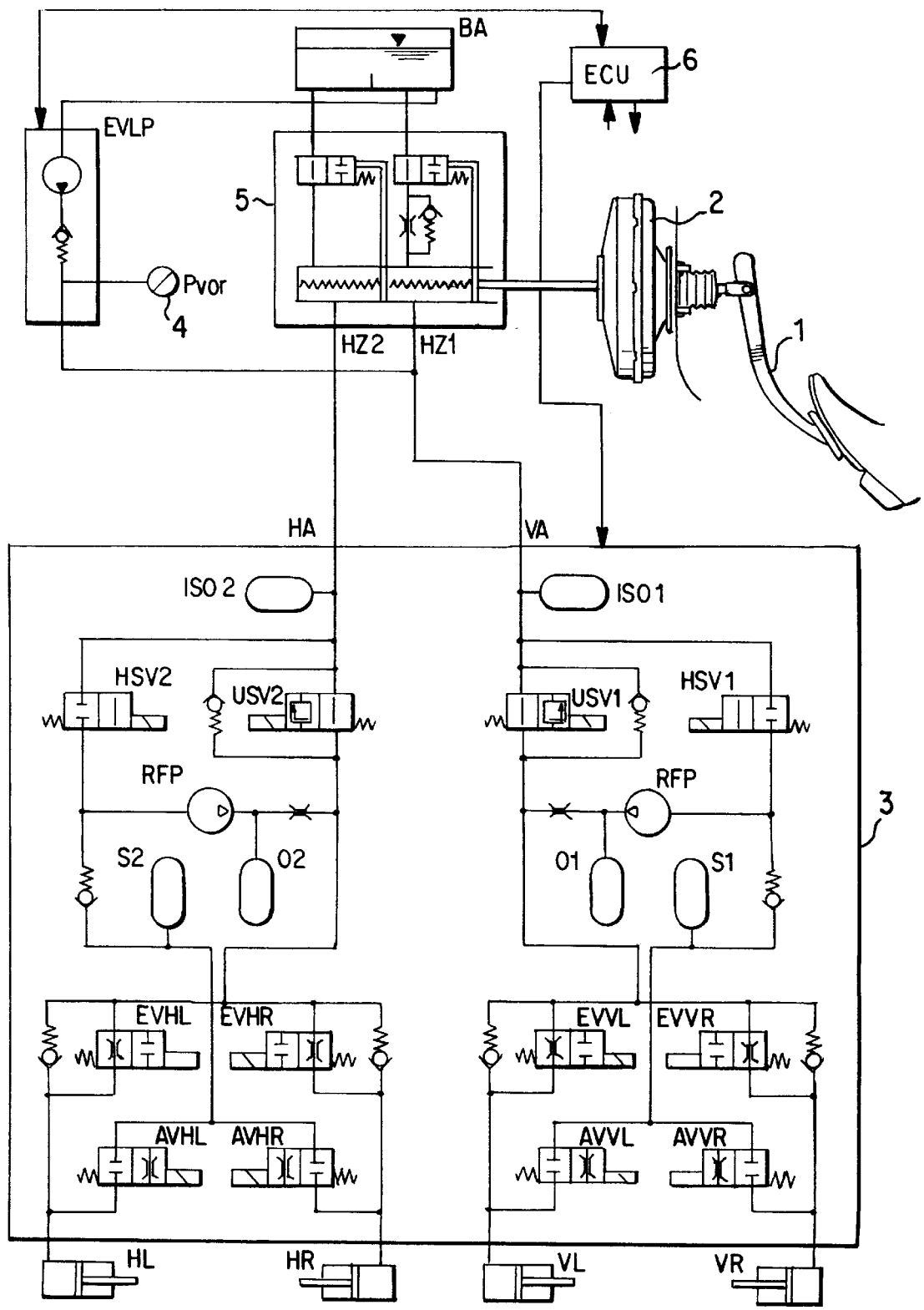
FIG. 1 is a schematic block diagram of exemplary components of the brake system according to the invention.

In FIG. 1, a brake pedal 1 to be operated by the driver is connected with a brake booster 2. The brake booster 2 interacts with a master brake cylinder 5. An electronically regulatable brake unit 3 is arranged between the master cylinder 5 and the wheel brakes HL, HR, VL and VR. The actuators of the electronically regulatable brake unit 3 are triggered by way of an electronic control unit 6. Furthermore, the control unit 6 senses the preliminary pressure (Pvor) existing at the output of the master brake cylinder 5 by means of the preliminary pressure sensor 4. Also, the control unit 6 has additional inputs and outputs for input and output signals. In particular, the control unit 6 senses signals, for example, the brake pressure values in the wheel brakes or the rotational wheel speeds, by means of which the actual vehicle deceleration (−a) can be determined at least indirectly.

The following legend is provided for FIG. 1.

| AVHL | outlet valve rear left | HR | wheel brake rear right |
|---|---|---|---|
| AVHR | outlet valve rear right | HSV1, HSV2 | high-pressure switching valve 1, 2 |
| AVVL | outlet valve front left | HZ1, HZ2 | master cylinder connection 1, 2 |
| AVVR | outlet valve front right | ISD1, ISD2 | integrated suction damper 1, 2 |
| BA | brake fluid compensation tank | Pvor sensor | preliminary pressure |
| D1, D2 | damper chamber | S1, S2 | storage chamber 1, 2 |
| EVHL | inlet valve rear left | sRFP | regenerative recirculating pump |
| EVHR | inlet valve rear right | U1, U2 | vacuum protection valve 1, 2 |
| EVLP | single precharge pump | USV1, USV2 | switch valve 1, 2 |
| EVVL | inlet valve front left | VA | front axle (hydraulic connection) |
| EVVR | inlet valve front right | VL | wheel brake front left |
| HA | rear axle (hydraulic connection) | R | wheel brake front right |
| HL | wheel brake rear left | | |

Figure 2:
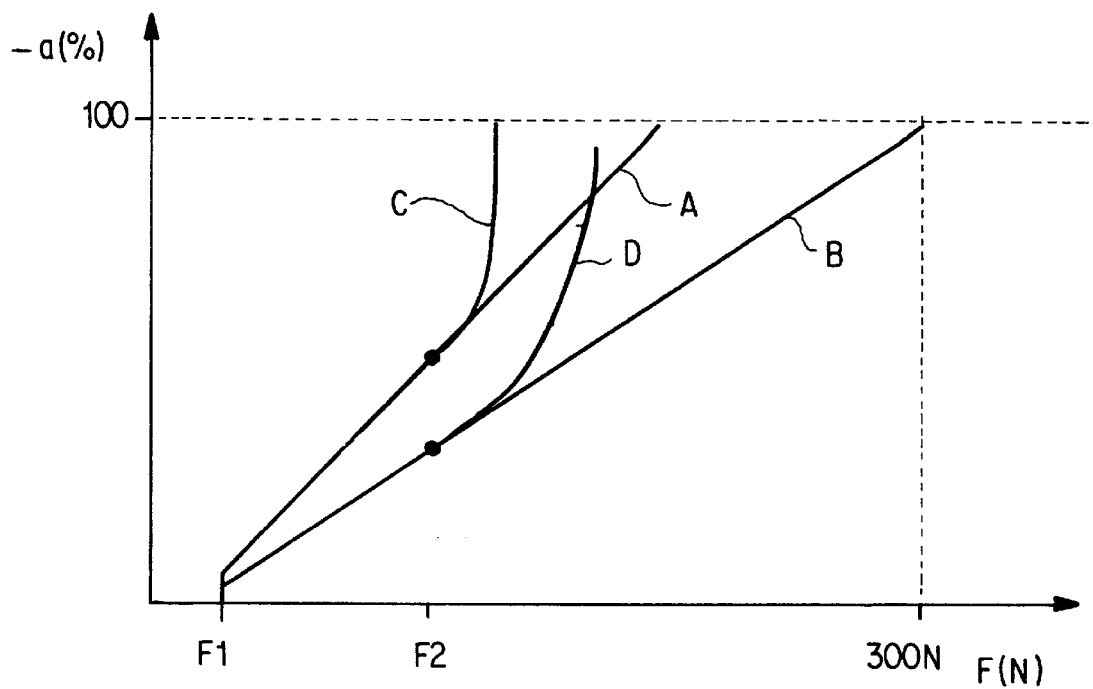
FIG. 2 is a graphical view of desired deceleration courses with an increased deceleration gradient when a defined threshold value of the brake pedal force has been reached, caused by the increase of the wheel brake pressure at a given ratio to the preliminary pressure, not taking into account the resulting deceleration.
Figure 3:
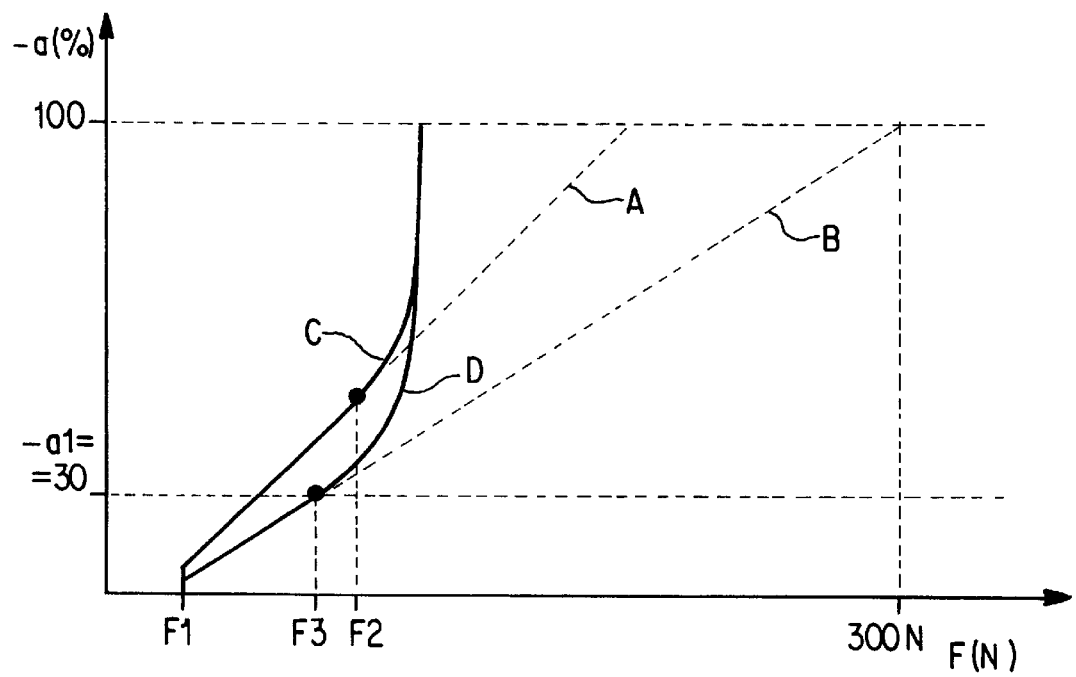
FIG. 3 is a graphical view of regulating the deceleration, when a predetermined deceleration threshold value has been reached, by means of the electronically regulatable brake unit corresponding to an optimal desired characteristic deceleration curve.

In FIGS. 2 and 3, the deceleration −a is indicated in % (0 to 100%) above the pedal operating value F (N) (for example, 0–300 N). In this case, the pedal operating value F preferably corresponds to the pedal force which is applied by the driver by way of the brake pedal and which is formed from the preliminary pressure which is measured by the preliminary pressure sensor 4 at the output of the master brake cylinder 5. In the following the term "pedal force" F is used for the pedal operating value F.

In the embodiment according to FIG. 2, the pedal force curve achieved by means of the brake booster 2 is taken into account only in the electronic control unit (FIG. 1). FIG. 2 shows, as examples of the resulting decelerations, the deceleration course A for the most favorable case, and the deceleration course B for the least favorable case. The most favorable case occurs, in particular, in the case of a high vacuum, when the vehicle is not loaded, in the case of a high friction value of the lining, and without a trailer being towed. The least favorable case exists, in particular, in the case of a low vacuum, when the vehicle is fully loaded, in the case of a low friction value of the lining or with a trailer being towed. The deceleration courses A and B with the continuously constant deceleration gradients would occur by means of the brake booster according to the prior art without the brake system according to the invention. However, according to the invention, the pedal force F is sensed in the control unit 6. By means of this control unit 6 and the electronically regulatable brake unit 3, when a predetermined threshold value F2 of the pedal force F is reached, the brake pressure is generated in the wheel brakes HL, HR, VL and VR such that, if the pedal force F rises further beyond the threshold value F2, steeper deceleration gradients occur in the sense of an increase of the brake booster ratio corresponding to the deceleration courses C and D with respect to the deceleration courses A and B. The "desired deceleration courses" with a steep or "raised" deceleration gradient, when a predetermined threshold value of the brake pedal force has been reached, are preferably caused by increasing the wheel brake pressure at a defined ratio to the preliminary pressure, here in the form of a non-linear booster factor, without having to take into account the resulting decelerations. In the sense of a control, in contrast to a regulating, the booster factor may be the same for all deceleration courses C to D.

In a supplementary manner, it is pointed out that, as known, the brake booster becomes operative only when a certain response pedal force F1 is reached. Between the response pedal force F1 and the pedal force threshold value F2, deceleration courses may also occur between the curves A and B.

As a function of the deceleration course (for example, A or B) achieved only by means of the brake booster 2, different pedal force threshold values F2 can also be defined (not illustrated in FIG. 2).

Corresponding to FIG. 2, the raised deceleration gradients increase continuously after the deceleration courses C and D with the further increase of the pedal force F beyond the pedal force threshold value F2. As a result, a "soft" transition is achieved from the at first linear brake booster ratio to the simulated increased brake booster ratio.

FIG. 3 shows an alternative to the embodiment illustrated in FIG. 2. FIG. 3 shows a desired characteristic deceleration curve C which is determined empirically, preferably for the most favorable case, and is stored in the control unit 6. Also, as illustrated in FIG. 3, the desired characteristic deceleration curve C, when a predetermined pedal force threshold value F2 has been reached, with a further increase of the pedal force F, may have a continuously further rising increased deceleration gradient. However, a continuously further rising increased deceleration gradient is not absolutely necessary.

First, until a predetermined deceleration threshold value −a1, for example, 30%, is reached, the electronic control unit 6 senses the actual deceleration course reached only by the brake booster 2—in the example according to FIG. 3, corresponding to the deceleration course B. When the predetermined deceleration threshold value −a1 is reached, the actual pedal force F3 existing at this point in time is determined. The actual deceleration for the pedal force F3, which corresponds to the predetermined deceleration threshold value −a1, is compared with the desired deceleration which is defined corresponding to the desired characteristic deceleration curve C for this pedal force F3. If the actual deceleration is lower than the desired deceleration for the pedal force F3, as illustrated in FIG. 3, then by means of the electronically regulatable brake unit 3, the brake pressure in the wheel brakes is generated in the sense of a regulating such that the desired deceleration course is obtained corresponding to the desired characteristic deceleration curve C. That is to say, the desired deceleration course C is not followed before a predetermined deceleration threshold value −a1 has been reached, in this case, for example 30%. As an alternative, the desired deceleration course C may not be followed before a predetermined threshold value of the pedal force F is reached, such as the threshold value F2 (not shown here).

According to the invention, the desired deceleration course C can also be followed continuously, that is, without waiting for a predetermined deceleration threshold value −a1 or of a predetermined threshold value F2 of the pedal force F to be reached. However, this may result in an almost permanent regulating of the brake unit and thus in an overtaxing of the system. For these reasons, it is more advantageous to wait for the predetermined threshold values to be reached before a regulating takes place corresponding to the desired characteristic deceleration curve C.

Furthermore, as illustrated in FIG. 3, the actual deceleration course is adapted to the desired deceleration course C corresponding to a curve D, for example, by means of the definition of a booster factor, which can be differentiated continuously, in order to increase the comfort of the brake system by means of a soft transition.

Thus, by means of the brake system according to the invention, all advantages are achieved which would be achieved by a brake booster with an arbitrarily adjustable booster ratio without having to mechanically change known brake systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle brake system having a brake pedal, a brake booster, a master brake cylinder and an electronically regulatable brake unit arranged between the master brake cylinder and wheel brakes of the vehicle, the brake system comprising:

an electronic control unit adjusting a brake pressure in the wheel brakes independently of a preliminary pressure existing at an output of the master brake cylinder;

wherein the electronic control unit senses a course of a pedal operating value from the brake booster directly proportional to a pedal force applied by a driver via a brake pedal; and further wherein when a predetermined threshold value of the pedal operating value has been reached, the brake pressure in the wheel brakes is generated via the electronically regulatable brake unit such that over a course of the deceleration, a raised deceleration gradient is obtained with a further rise of the pedal operating value in a sense of an increase of a brake booster ratio.

2. The brake system according to claim 1, wherein the raised deceleration gradient continuously rises with a further increase of the pedal operating value.

3. The brake system according to claim 1, wherein the pedal operating value is formed of a preliminary pressure measured at the output of the master brake cylinder.

4. The motor vehicle brake system having a brake pedal, a brake booster, a master brake cylinder and an electronically regulatable brake unit arranged between the master brake cylinder and wheel brakes of the vehicle, comprising:

an electronic control unit adjusting a brake pressure in the wheel brakes independently of a preliminary pressure existing at an output of the master brake cylinder;

wherein the electronic control unit senses a deceleration course achieved by the brake booster as a function of a pedal operating value directly proportional to a pedal force applied by a driver via a brake pedal; and further wherein the electronically regulatable brake unit generates the brake pressure in the wheel brakes such that a desired deceleration course corresponding to a desired characteristic deceleration curve stored in the electronic control unit occurs when an actual deceleration course deviates from the desired deceleration course.

5. The brake system according to claim 4, wherein the actual deceleration course deviates from the desired deceleration course within a defined tolerance range.

6. The brake system according to claim 4, wherein the desired deceleration course is not followed before a predetermined deceleration threshold value is reached and/or when a predetermined threshold value of the pedal operating value has been reached.

7. The brake system according to claim 6, wherein when the predetermined threshold value of the pedal operating value has been reached, the deceleration gradient of the desired characteristic deceleration curve rises continuously.

8. The brake system according to claim 6, wherein the actual deceleration course is adapted to the desired deceleration course in a continuously differentiated manner.

9. The brake system according to claim 4, wherein when a predetermined threshold value of the pedal operating value has been reached, the deceleration gradient of the desired characteristic deceleration curve rises continuously.

10. The brake system according to claim 9, wherein the actual deceleration course is adapted to the desired deceleration course in a continuously differentiated manner.

11. The brake system according to claim 4, wherein the actual deceleration course is adapted to the desired deceleration course in a continuously differentiated manner.

12. The brake system according to claim 4, wherein the pedal operating value is formed of a preliminary pressure measured at the output of the master brake cylinder.

13. A process for controlling a motor vehicle brake system having a brake pedal, a brake booster, a master brake cylinder, an electronic control unit and an electronically regulatable brake unit arranged between the master brake cylinder and wheel brakes of the motor vehicle, the process comprising the acts of:

sensing a course of a pedal operating value achieved by the brake booster which is directly proportional to a pedal force applied by a driver via a brake pedal; and when a predetermined threshold value of the pedal operating value is reached, generating the brake pressure in the wheel brakes via the electronically regulatable brake unit such that a raised deceleration gradient occurs over a course of the deceleration with a further rise of the pedal operating value.

14. The process according to claim 13, further comprising the act of continuously raising the deceleration gradient with a further increase of the pedal operating value.

15. A process for controlling a motor vehicle brake system having a brake pedal, a brake booster, a master brake cylinder, an electronic control unit and an electronically regulatable brake unit arranged between the master brake cylinder and wheel brakes of the motor vehicle, the process comprising the acts of:

sensing, in the electronic control unit, a deceleration course achieved by the brake booster as a function of a pedal operating value directly proportional to a pedal force applied by a driver via a brake pedal;

generating the brake pressure in the wheel brakes via the electronically regulatable brake unit such that a desired deceleration course corresponding to a desired characteristic deceleration curve stored in the electronic control unit occurs when an actual deceleration course deviates from a desired deceleration course.

16. The process according to claim 15, further comprising the act of not following the desired deceleration course before a predetermined deceleration threshold value has been reached and/or when a predetermined threshold value of the pedal operating value has been reached.

17. The process according to claim 15, further comprising the act of continuously raising the deceleration gradient of the desired characteristic deceleration curve when a predetermined threshold value of the pedal operating value has been reached.

18. The process according to claim 15, further comprising the act of adapting the actual deceleration course to the desired deceleration course in a continuously differentiated manner.

19. A software product for controlling a motor vehicle brake system having a brake pedal, a brake booster, a master brake cylinder, an electronic control unit and an electronically regulatable brake unit, the software product comprising:

a computer readable medium having stored thereon code segments that:

sense a course of a pedal operating value achieved by the brake booster which is directly proportional to a pedal force applied by a driver via a brake pedal; and when a predetermined threshold value of the pedal operating value is reached, generate a brake pressure signal for the wheel brakes to the electronically regulatable brake unit such that a raised deceleration gradient occurs over a course of the deceleration with a further rise of the pedal operating value.

20. A software product for controlling a motor vehicle brake system having a brake pedal, a brake booster, a master brake cylinder, an electronic control unit and an electronically regulatable brake unit, the software product comprising:

a computer readable medium having stored thereon code segments that:

sense a deceleration course achieved by the brake booster as a function of a pedal operating value directly proportional to a pedal force applied by a driver via a brake pedal; and generate a brake pressure signal for the wheel brakes to the electronically regulatable brake unit such that a desired deceleration course corresponding to a desired characteristic deceleration curve stored in the electronic control unit occurs when an actual deceleration course deviates from a desired deceleration course.

\* \* \* \* \*